United States Patent [19]

Fournier et al.

[11] Patent Number: 4,786,173

[45] Date of Patent: Nov. 22, 1988

[54] METHOD AND APPARATUS FOR PHASE MODULATING A FIBER-OPTIC ROTATION SENSOR

[75] Inventors: Joseph T. Fournier, Glastonbury, Conn.; Timothy J. Bailey, Longmeadow, Mass.

[73] Assignee: United Technologies Corporation, Hartford, Conn.

[21] Appl. No.: 799,780

[22] Filed: Nov. 21, 1985

[51] Int. Cl.$^4$ .............................................. G01B 9/02
[52] U.S. Cl. ..................................................... 356/350
[58] Field of Search ........................................ 356/350

[56] References Cited

PUBLICATIONS

Giallorenzi et al., "Optical Fiber Sensor Technology", IEEE Journal of Quantum Electronics, Apr. 1982, pp. 639–640.
Schiffner, "Optical Fiber Gyroscope Based on the Sagnac Effect", Siemens Res. Rep., vol. 9, pp. 16–25, 1980.

Primary Examiner—Vincent P. McGraw
Assistant Examiner—S. A. Turner
Attorney, Agent, or Firm—Francis J. Maguire, Jr.

[57] ABSTRACT

A method for phase biasing a fiber-optic SAGNAC rotation sensor is disclosed comprising the inclusion near one end of the sensing coil of a phase modulator consisting of a second coil of fiber free to rotate independently of the sensing coil. The modulator coil is made to oscillate and the desired phase difference modulation is produced by means of the SAGNAC effect in the oscillating coil. Two novel modulator drivers are disclosed. Both have a rigid support hub having radially extending spokes which bend in mechanical synchronism in response to a piezoelectrically induced motive force. The optical fiber is wrapped like a rim around the outside of the spokes for being rotated in an oscillatory manner to effect the desired phase difference modulation.

7 Claims, 2 Drawing Sheets

METHOD AND APPARATUS FOR PHASE MODULATING A FIBER-OPTIC ROTATION SENSOR

DESCRIPTION

1. Technical Field

The present invention relates to rotation induced phase modulation in fiber-optic SAGNAC interferometers.

2. Background Art

A basic fiber-optic SAGNAC interferometer includes a laser source which provides coherent light incident on a beamsplitter which divides the beam into two substantially equal parts. The beams are then coupled into each end of a length of optical fiber in a coil of one or more turns of a certain radius. The light beams counter-propagate in opposite directions around the coil and recombine at the beamsplitter. Interference of the two coherent beams of light in the beamsplitter results in an optical output signal the intensity of which varies sinusoidally with the relative phase difference between the two beams. It will be appreciated that the phase difference must result from non-reciprocal effects, i.e., phenomena which offset the two counter-propagating beams differently. (Reciprocal effects, which affect both beams equally, cancel out upon interference.) One such non-reciprocal effect is the SAGNAC effect, an essentially relativistic phenomenon whereby rotation of the fiber-optic coil about an axis normal to the coil induces a phase shift between the two counter-propagating beams. (See for example E. J. Post., Rev. Modern Phys. 39, 475 (1967)). Optical gyroscopes function by detecting and measuring the SAGNAC phase shift induced in an interferometer which, for example, could be an elaborated version of the fiber-optic SAGNAC interferometer described above. However, in such a basic implementation the sensitivity of the interferometer to low rotation rates is low. This is so because if the rotation rate is zero (no phase difference between the two counter-propagating beams) the beams interact constructively, giving rise to maximum optical intensity. When the phase difference is zero, sensitivity is also zero because of operation at the peak of the characteristic cosine curve. For low rotation rates (small phase differences) sensitivity is correspondingly low. As the rotation rate increases the sensitivity increases until maximum sensitivity is reached where the phase difference is $\pi/2$, corresponding to the steep slope of the characteristic cosine function at this point. Thus, for rotation sensing with high sensitivity to low input rates it is necessary to implement a $\pi/2$ non-reciprocal phase shift bias. Because of the essential symmetry of the SAGNAC interferometer (the counter-propagating beams travel the same path in opposite directions) suitable means for providing a reliable controllable phase shift are few. One widely used approach in fiber-optic rotation sensors requires the placement of a device for producing a small periodic stretching of the fiber near one end of the coil. Because the two beams launched into the opposite ends of the coil pass through this stretcher at slightly different times, the two beams traverse at slightly different path lengths, and a non-reciprocal modulation of the phase difference results. As a result of the modulation, the rotation rate information is available in the output at harmonics of the modulation frequency and, for example, the signal at the modulation frequency is biased by a phase of $\pi/2$, as discussed. A means for implementing such a modulator is disclosed in co-pending application U. S. Ser. No. 768,308, PHASE MODULATOR FOR FIBER OPTIC SENSORS, filed Aug. 28, 1985 by Fournier et al.

In co-pending application Ser. No. 735,235, ROTATION INDUCED PHASE MODULATION IN PASSIVE SAGNAC INTERFEROMETERS, filed May 17, 1985 by Bailey et al, a SAGNAC interferometer is mounted on a platform within a base and vibrated about a given axis. The vibration induces a periodically varying SAGNAC phase difference which causes the intensity of the output signal from the interferometer to be modulated at a frequency related to the mechanical vibration. The desired information about the rotation rate to be measured is present in the output at harmonics of the modulation frequency. Suitable detection techniques such as synchronous demodulation or digital signal processing may be used to recover this information. In implementing this approach, means must be provided to vibrate the fiber coil. In a sensitive gyroscopic instrument this coil may consist of in excess of a kilometer of optical fiber which must be supported on a form which may be of metal or ceramic suitable to maintain the coil when subject, for example, to the varying temperature and shock environment encountered in flight. In addition, for purposes of achieving a compact structure, additional gyroscopic components may be incorporated in the interior of the coil form. Thus, means for suspending and vibrating essentially the entire gyroscope must be provided.

DISCLOSURE OF THE INVENTION

It is an object of the present invention to provide a method for achieving an oscillatory phase modulation in SAGNAC interferometers with reduced and simplified drive requirements. It is a further object of this invention to provide an apparatus for achieving such modulation.

According to the present invention, a length of fiber from one end of a sensing coil is wound to form a second coil which is free to rotate independently of the sensing coil. Oscillation of this second coil at an appropriate frequency and with appropriate amplitude will induce a time delayed SAGNAC phase difference adequate to modulate the interferometric output signal. By oscillating a small number of turns near one end of the sensing coil a great reduction in the mass of fiber which must be oscillated is attained and simplified packaging results. Since the sensing coil is fixed it does not require special mounting. To realize these advantages, as disclosed herein, the modulation coil must be oscillated at a relatively high frequency.

In further accord with the present invention, an optical fiber vibrator is disclosed which may be used to effect the above time delayed oscillatory phase modulation. It consists of a rigid support hub having radially extending spokes which bend in mechanical synchronism in response to a piezoelectrically induced motive force. An optical fiber, being part of a SAGNAC interferometer light path, is wrapped like a rim around the outside of the spokes and attached thereto for being rotated in an oscillatory manner in order to effect modulation of the phase difference between the counter-propagating light beams introduced into the light path. The intensity of the recombined light beams is thereby modulated. The modulated recombined light beams are conditioned in order to extract preselected frequencies and thereby to obtain the desired indication of the measured phenomenon, for example, by means of phase-sensitive detection.

In still further accord with the present invention, the spokes of the above described vibrator may be made of piezoelectric bender plates attached to the rigid support hub, each of the plates having electrodes for connection to an external excitation source. The source may be connected identically on each plate so that they are driven in synchronism and the optical fiber coil is vibrated in an oscillatory rotary manner about the hub axis.

In still further accord with the present invention, the spokes may be made of a non-piezoelectric flexible material one or more of which may be driven by an associated piezoelectric longitudinal expander bar fixed in space at the end not attached to the spoke and having electrodes for connection to an external excitation source. Synchronized longitudinal expansion of each bar will thereby effect synchronized bending of the spokes and will result in an oscillatory rotary vibration about the hub axis by the attached fiber-optic loop. By way of example, an oscillator having flexible spokes driven by longitudinal piezoelectric expander bars capable of operation at 100 kHz is disclosed, this being the optimum modulation frequency for a rotation sensor with a 1 km fiber optical path. For a modulation coil of 5 cm diameter oscillated at a frequency of 100 kHz, optimum oscillation amplitude can be attained, for example, with a modulator coil of ten turns driven at approximately 29 volts. Oscillators employing today's commercially available piezoelectric benders are suitable for lower frequency operation.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
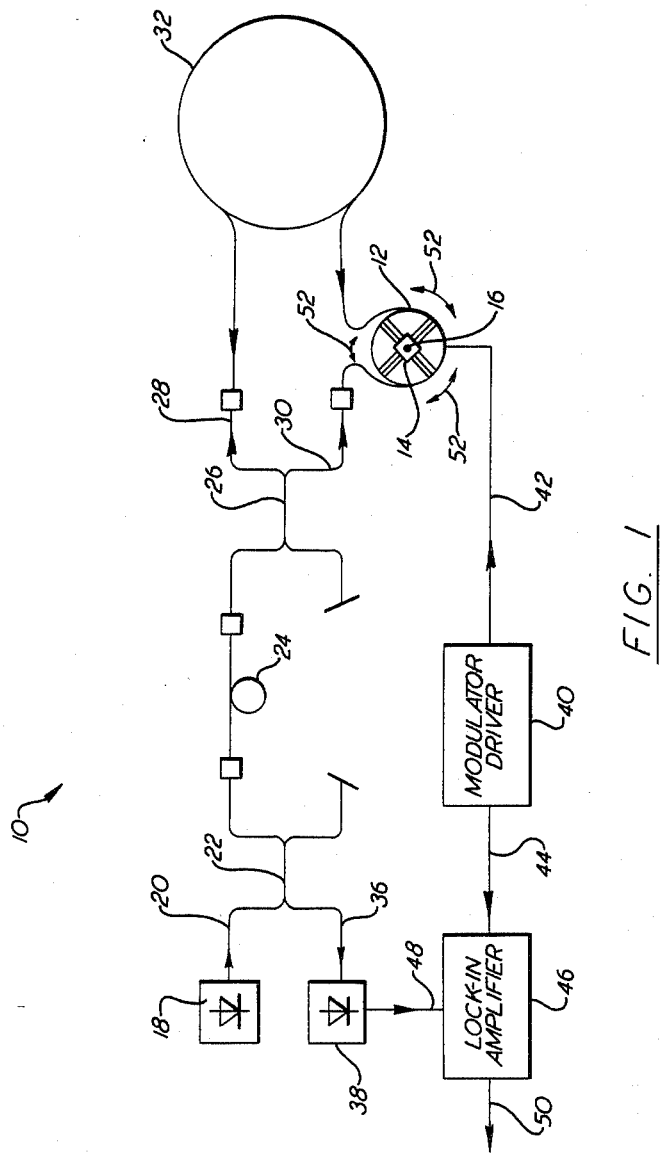
FIG. 1 is a simplified block diagram illustration of a fiber-optic rotation sensor having a portion of its sensing loop vibrated, according to the present invention.

FIG. 1 is an illustration of a SAGNAC rotation sensor 10, according to the present invention. The sensor includes an oscillating phase modulator 12 having a number of loops of fiber at an asymmetric position in the sensing coil, e.g., at one end of the fiber loop. The phase modulator is rotated in a vibratory manner about a rigid hub 14 having a central axis 16 about which the coils are rotated.

The sensor shown in FIG. 1 includes a diode source of coherent light 18 which is propagated along an optical fiber 20 into a coupler 22 and on into a polarizer 24, another coupler 26 and into a pair of optical fibers 28, 30 which propagate the split beam in opposing directions into a fiber sensing coil 32 having, in some cases, as much as a kilometer or more of fiber.

As disclosed in the application of Bailey et al, ROTATION INDUCED PHASE MODULATION IN PASSIVE SAGNAC INTERFEROMETERS, U.S. Ser. No. 735,235, filed on May 17, 1985, the entire sensor 10 or at least the entire fiber-optic loop 32 may be placed on a platform and vibrated about an axis typically perpendicular to the plane of the loop in order to induce modulation of the phase difference between the counter-propagating beams. The present invention, in an improvement to this approach, produces the desired phase modulation instead by oscillation of a small second modulation coil 12 near one end of the coil. It is particularly advantageous to take this approach since the total mass to be vibrated is thus significantly reduced. Also the modulator coil can be conveniently mounted, e.g., inside the sensing coil thereby producing a device of reduced complexity and more compact design. The counter propagating beams are recombined at the coupler 26 and repropagate along the same path as from the diode source 18 except that the returning beams are split at the coupler 22 and provided on an optical fiber 36 to a solid state detector 38.

A modulator driver 40 provides a drive signal on a line 42 to the modulator 12 and a reference signal on a line 44 to a lock-in amplifier 46 which is also responsive to the detected signal on a line 48. The lock-in amplifier provides an output signal on a line 50 which is proportional to the sensed rotation.

A time-delayed oscillatory modulation of the phase difference is attained by oscillating a small number of turns near one end of the sensing coil as indicated in FIG. 1. In this Figure, the sensing coil is rigidly fixed. Only the modulation coil is driven in a periodic manner about the modulation coil axis 16 as shown by "vibratory arrows" 52. Advantages of the time delayed oscillation approach include a great reduction in the massive fiber which must be oscillated and simplified packaging since the sensing coil is fixed and therefore does not require special mounting. To realize these advantages the modulation coil must be oscillated at a relatively high frequency.

Figure 2:
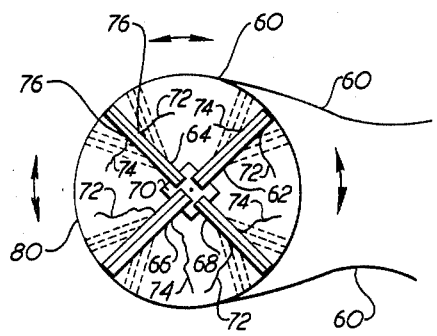
FIG. 2 is a simplified plan view of a modulator, according to the present invention.
Figure 3:
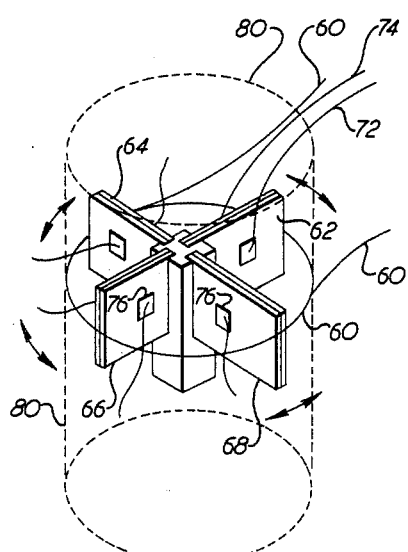
FIG. 3 is a perspective illustration of the modulator of FIG. 2.
Figure 4:
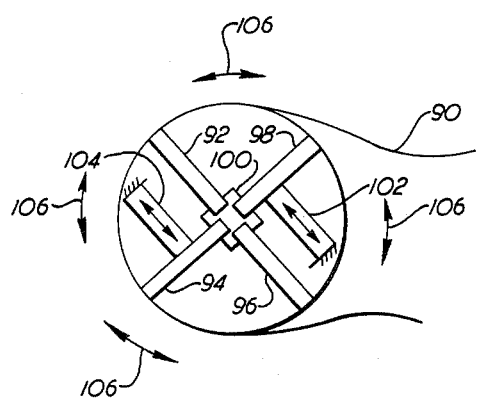
FIG. 4 is a simplified plan view of another modulator, according to the present invention.

Two distinct oscillator mechanisms are depicted in FIGS. 2 and 4. FIG. 3 is a perspective view of the mechanism of FIG. 2. In the oscillator shown in FIG. 2, a fiber coil 60 is affixed to laminated piezoelectric bender plates 62, 64, 66, and 68 arranged as spokes rigidly attached to a hub 70 and extending radially outward therefrom. Replicated pairs 72, 74 of excitation leads are attached to electrode pads 76 which are themselves attached to each face of each bender plate. See FIG. 3 for a better view of the pads. The plates are excited in synchronism so that the plates bend in the same direction, at the same time, to the same degree, as shown in phantom lines in FIG. 2. This is to insure that the entire coil is rotated without stretching or compressing any of the optical fiber. A form 80 shown in phantom lines in FIG. 3 may be attached to the bender plates so that the coil 60 may be wound onto the form. Such an oscillator, using commercially available benders, is suitable primarily for operation at relatively low frequencies, on the order of several hundred hertz.

For optimum operation of a fiber-optic sensor with a sensing coil of 0.5–1 km length, an oscillation frequency on the order of 100–200 kilohertz is required. A mechanism capable of operating in this range is shown in FIG. 4. Again, a fiber coil 90 is affixed to spokes 92, 94, 96, 98 which are rigidly attached to a hub 100 and which extend radially outward therefrom. The spokes in this case are just thin, flexible support members. Linear piezoelectric expanders 102, 104 are attached to spokes 98, 94, respectively, as shown. When driven in synchrony an oscillation of the coil results as shown by arrows 106.

Specific oscillator design parameters can be determined as follows: for the interferometer of FIG. 1, it can be shown that with time delayed periodic modulation of the phase difference $\phi_m$ defined by the equation:

$$\phi_m = \phi_o \cos\omega_m t.$$

where $\phi_o$ is the amplitude of the phase modulation and $\omega_m$ is the angular frequency of the modulation signal, the component of the detected power varying at the modulation frequency is given by (see e.g., K. Bohm, P. Russer, E. Weidel and R. Ulrich, "Low-noise Fiber-optic Rotation Sensing", Optics Letters 6, 64 (1981)):

$$P_{\omega m} = P_o \sin\phi_s J_1(2\phi_o \sin \omega_m \tau/2)\sin \omega_m t$$

where
- $\phi_s$ = the SAGNAC phase shift due to the sensed rotation,
- $\tau$ = the propagation time for light traversing these fiber coils,
- $P_o$ = the power incident on the fiber coil, and
- $J_1$ = the Bessel function of order 1.

It will be appreciated that it is desirable to maximize this power to produce the greatest output signal. This is achieved if the argument of the Bessel function satisfies the relationship $$2\phi_o \sin\omega_m \frac{\tau}{2} = 1.84 \text{ rad}.$$

The term $\sin \omega_m \tau/2$ takes on a maximum value of unity for $\omega_m \tau = \pi$. By way of example, for a fiber coil 1 km in length, a modulation frequency of 100 kHz is required to satisfy this condition. With $\omega_m \tau = \pi$, the maximum value of the Bessel function is attained with a modulation amplitude $\phi_o = 0.92$ radian. Of course, it is possible also to maximize the power at a lower modulation frequency by providing a correspondingly lower phase amplitude. The design described here is based on the conditions derived above, i.e., $\omega_m \tau = \pi$, and $\phi_o = 0.92$ radian. In addition, the length of the sensing coil is taken to be 1 km so the modulation frequency satisfying the condition $\omega_m \tau = \pi$ is 100 kHz.

For the oscillating modulator of this invention, the modulation amplitude $\phi_o$ is given by the expression $$\phi_o = \frac{2\pi^2 N d^2}{\lambda c} \theta_m \omega_m,$$

where
- N = the number of turns on the modulator coil,
- d = the diameter of the modulator coil,
- $\lambda$ = the wavelength of the light emitted by the base source,
- c = the speed of light, and
- $\phi_m$ = the amplitude of the oscillation of the modulator coil.

For a 5 cm diameter coil, a source wavelength $\lambda = 0.85\mu$ and a modulation frequency of 100 kHz, evaluation of the previous equation for $\phi_o$ gives the result $\phi_o = 126 N\theta_m$. If it is required that $\phi_o = 0.92$ rad then the requirement on the product $N\theta_m$ becomes $$N\phi_m = 7.3 \times 10^{-4} \text{ rad}.$$

With reference to the "spoke pusher" modulator of FIG. 4, the expander bars can be fabricated from commercially available piezoelectric ceramic (e.g., the material denoted PZT-5H by Veinitron Piezoelectric Division, Bedford, Ohio). For a thin bar of PZT-5H of length L, the resonant frequency is given by f=(1420/l) Hz-meter: Thus a bar of length 1.42 cm has a resonant frequency of 100 kHz, the frequency desired for the modulator. For a PZT bar of length l and thickness t, the change in length l due to an applied voltage V at the resonant frequency is determined from the equation $$\Delta l = Q d_{31} \frac{l}{t} V,$$

Where $d_{31}$ is the relevant piezoelectric constant for a linear expansion due to a transverse voltage, and Q is the mechanical Q of the resonant bar. If the activators 102, 104 are located at the center of the spokes as shown in FIG. 4, motion of the bar is multiplied by a factor of two at the circumference. Thus the modulation amplitude $\theta_m$ is found to be $$\theta_m = 4Q \frac{d_{31} l}{dt} V$$

where
- Q = the mechanical Q of the PZT bar,
- $d_{31}$ = the piezoelectric constant of the PZT bar,
- l = the length of the PZT bar,
- t = the thickness of the PZT bar,
- d = the diameter of the modulator coil, and
- V = the drive voltage applied to the PZT bar.

Substituting the expression for $\theta_m$ into the previously derived requirement $N\theta_m = 7.3 \times 10^{-4}$ radians, and using the manufacturer's values for PZT-5H ($d_{31} = 274 \times 10^{-12}$ meter/volt), Q=65, it is found that for a 1.42 cm long bar of thickness 0.079 cm the desired modulator performance is attained if the product of the number of turns on the modulator N and the drive voltage V satisfy the relation $$NV = 286.$$

This is readily achieved, e.g., with 10 turns of fiber and a 28.6 V drive. With today's commercially available bender plates, the modulator shown in FIGS. 1 and 2 would be suitable for low frequency drive only. By way of example, for Vernitron PZT-5B, the resonant frequency of a bender plate is given by $$f_r = 43.18 \, t/l^2 \text{ kHz}$$

where l is the length of the plate and t is the thickness in centimeters. (See Engineering Report TP 237—Vernitron Piezoelectric Division, Bedford, Ohio). For a 2.54 cm long plate 0.07938 cm in thickness, the resonant frequency is approximately 530 Hz. Plates with higher resonant frequencies can be designed but, for a set drive voltage the displacement of such a plate will be diminished. Nevertheless, this modulator could find use in cores where low frequencies or low modulation amplitude are appropriate.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A method employing a SAGNAC interferometer for measuring rate of rotation, comprising the steps of:
   providing counter-propagating coherent light beams along a fiber-optic light path at least part of which path consists of a first coil of optical fiber for use as a sensing coil;
   providing means for recombining the counter-propagating beams to produce an interferometric output signal the intensity of which varies with rotation rate according the SAGNAC effect;
   providing a second separate coil of optical fiber for use as a modulator coil, the second coil being coiled around as a rim on a spoked wheel and being located in the optical path of the counter-propagating beams near one end of the first coil, the second coil rim being free to rotate independently of the first coil about an axis through a rigid hub of the wheel;
   oscillating the second coil rim about the hub by bending the spokes in mechanical synchronism in response to a piezoelectrically induced motive force for introducing a time varying phase shift between the counter-propagating beams for causing the intensity of the output signal containing the rotation rate information to be modulated at the frequency of the oscillation;
   detecting the interferometric output signal and providing an electrical output signal indicative thereof; and
   demodulating the electrical output signal to recover a signal from which the rotation rate may be inferred.

2. An optical apparatus for measuring rotation employing a SAGNAC interferometer, comprising:
   a first coil of optical fiber for use as a sensing coil;
   means for providing counter-propagating coherent light beams along a fiber-optic light path at least part of which path consists of the first coil of optical fiber;
   means for recombining the counter-propagating beams to produce an interferometric output signal the intensity of which varies with rotation rate according to the SAGNAC effect;
   a second separate coil of optical fiber for use as a modulator coil, the second coil being located in the optical path of the counter-propagating beams near one end of the first coil, the second coil being free to rotate independently of the first coil;
   means for oscillating the second coil, comprising a rigid support hub having spokes extending radially outward therefrom for bending in mechanical synchronism in response to a piezoelectrically induced motive force, the second coil being wrapped as a rim around the outside of the spokes and attached thereto for being vibrated in an oscillatory manner about a hub axis for introducing a time varying phase shift between the counter-propagating beams for causing the intensity of the output signal containing the rotation rate information to be modulated at the frequency of the oscillation;
   detection means, responsive to the interferometric output signal for providing an electrical output signal indicative thereof; and
   electronic means, responsive to the electrical output signal for demodulating the electrical output signal for recovering a signal from which the rotation rate may be inferred.

3. The modulator of claim 2, wherein the spokes are piezoelectric bender plates attached to the rigid support hub, each of the plates having electrodes for connection to an external excitation source which causes synchronized bending of the plates.

4. The modulator of claim 2, wherein at least one of the spokes are of a flexible material attached to one end of a corresponding piezoelectric longitudinal expander bar fixed at the other end having electrodes for connection to an external excitation source which causes synchronized longitudinal expansion of each bar thereby effecting synchronized bending of the spokes.

5. An optical fiber vibrator, comprising:
   a rigid support hub having an axis;
   spokes, extending radially outward from the hub axis for bending in mechanical synchronism in response to a piezoelectrically induced motive force; and
   an optical fiber, being part of a SAGNAC interferometer light path, wrapped like a rim around the outside of the spokes and attached thereto for being vibrated in an oscillatory manner rotationally about the hub axis in order to effect a phase difference modulation.

6. The vibrator of claim 5, wherein the spokes are piezoelectric bender plates attached to the rigid support hub, each of the plates having electrodes for connection to an external excitation source which causes synchronized bending of the plates.

7. The vibrator of claim 5, wherein at least one of the spokes are of a flexible material attached to one end of a corresponding piezoelectric longitudinal expander bar fixed at the other end having electrodes for connection to an external excitation source which causes synchronized longitudinal expansion of each bar thereby effecting synchronized bending of the spokes.

* * * * *